United States Patent
Butzmann (10) Patent No.: US 10,622,817 B2
(45) Date of Patent: Apr. 14, 2020

(54) METHOD FOR CONTROLLING AN OUTPUT VOLTAGE OF A BATTERY SYSTEM AND BATTERY SYSTEM DESIGNED TO CARRY OUT THE METHOD

(71) Applicant: Robert Bosch GmbH, Stuttgart (DE)

(72) Inventor: Stefan Butzmann, Schalksmühle (DE)

(73) Assignee: Robert Bosch GmbH, Stuttgart (DE)

( * ) Notice: Subject to any disclaimer, the term of this patent is extended or adjusted under 35 U.S.C. 154(b) by 405 days.

(21) Appl. No.: 15/324,466

(22) PCT Filed: Jun. 1, 2015

(86) PCT No.: PCT/EP2015/062116
§ 371 (c)(1),
(2) Date: Jan. 6, 2017

(87) PCT Pub. No.: WO2016/005108
PCT Pub. Date: Jan. 14, 2016

(65) Prior Publication Data
US 2017/0163052 A1    Jun. 8, 2017

(30) Foreign Application Priority Data
Jul. 7, 2014  (DE) .................. 10 2014 213 161

(51) Int. Cl.
*H02J 7/00*      (2006.01)
*B60L 58/19*    (2019.01)

(52) U.S. Cl.
CPC ............ *H02J 7/0024* (2013.01); *B60L 58/19* (2019.02); *B60L 2240/547* (2013.01);
(Continued)

(58) Field of Classification Search
CPC .................................................... H02J 7/0024
(Continued)

(56) References Cited

U.S. PATENT DOCUMENTS

| 2005/0053092 A1 | 3/2005 | Yang et al. |
| 2010/0261048 A1* | 10/2010 | Kim ............ H01M 10/44 429/150 |
| 2014/0035361 A1 | 2/2014 | Schmidt et al. |

FOREIGN PATENT DOCUMENTS

| CN | 101714786 A | 5/2010 |
| DE | 102011002548 | 7/2012 |

(Continued)

OTHER PUBLICATIONS

International Search Report for Application No. PCT/EP2015/062116 dated Sep. 15, 2015 (English Translation, 2 pages).

*Primary Examiner* — Samuel Berhanu
(74) *Attorney, Agent, or Firm* — Michael Best & Friedrich LLP (57) ABSTRACT

The present invention relates to a method for controlling an output voltage of a battery system comprising a plurality of battery cells, which are electrically interconnected in such a way that battery cells of the battery system can respectively be connected to the battery system and can be electrically bypassed. In order to adapt an actual output voltage of the battery system to a target output voltage, at least one switch-on probability is generated and the battery cells having the at least one generated switch-on probability are connected to the battery system and additionally at least one switch-off probability is generated and the battery cells having the at least one generated switch-off probability are electrically bypassed. The present invention further relates to a battery system designed to carry out the method according to the invention, comprising a plurality of electrically interconnected battery cells a plurality of activation circuits, and a control unit, wherein the battery cells can be respectively connected to the battery system or electrically bypassed by means of the activation circuits.

8 Claims, 4 Drawing Sheets

8 – FULL BRIDGE
11 – INTERFACE
12 – MICROCONTROLLER
13 – DRIVER
16 – CONTROLLER (52) U.S. Cl.
CPC .......... *Y02T 10/7005* (2013.01); *Y02T 10/705* (2013.01); *Y02T 10/7055* (2013.01)

(58) Field of Classification Search
USPC .................................................. 320/116–122
See application file for complete search history.

(56) References Cited

FOREIGN PATENT DOCUMENTS

| | | |
|---|---|---|
| DE | 102011014133 | 9/2012 |
| DE | 102011075376 | 11/2012 |
| DE | 102011079365 A1 | 1/2013 |
| KR | 20030092464 | 12/2003 |
| KR | 100749766 | 8/2007 |
| WO | 2014020582 | 2/2014 |

* cited by examiner

Fig. 1

8 – FULL BRIDGE
11 – INTERFACE
12 – MICROCONTROLLER
13 – DRIVER
16 – CONTROLLER

METHOD FOR CONTROLLING AN OUTPUT VOLTAGE OF A BATTERY SYSTEM AND BATTERY SYSTEM DESIGNED TO CARRY OUT THE METHOD

BACKGROUND OF THE INVENTION

The invention relates to a method for controlling an output voltage of a battery system comprising a plurality of battery cells which are electrically interconnected in such a way that battery cells of the battery system can each be connected to the battery system and can each be electrically bypassed, wherein, in order to adapt an actual output voltage of the battery system to a target output voltage, at least one switch-on probability is generated and the battery cells having the at least one generated switch-on probability are connected to the battery system.

The invention also relates to a battery system comprising a plurality of electrically interconnected battery cells, a plurality of activation circuits, and a control unit for the closed-loop control of an output voltage of the battery system, which is provided by the battery cells, wherein one of the activation circuits is assigned to each of the battery cells and the battery cells can each be connected to the battery system or electrically bypassed by means of the activation circuits.

It is known to electrically interconnect battery cells in order to meet requirements on battery systems in respect of their capacity and/or power. In particular, it is known in this case to electrically interconnect a plurality of battery cells in series to form a battery string and, in turn, to electrically interconnect these battery strings in parallel. In order to provide a required output voltage by means of the battery system, it is further known to connect such battery strings and/or individual battery cells of a battery system to the battery system, so that these battery cells contribute voltage to the output voltage. It is also known, for the purpose of providing a required output voltage, to electrically bypass battery cells of the battery system in order to disconnect the battery cells from the battery system in this way, so that these battery cells do not contribute voltage to the output voltage of the battery system.

In this case, it is problematic, in particular, that the individual battery cells have deviations in respect of their capacitance and their internal resistance, in particular for reasons related to production, and so the battery cells typically have states of charge which deviate from one another.

Battery systems comprising a plurality of battery cells are known from the documents KR 2003-92464, KR 2007-66293 and US 2005/053092, wherein, in order to adapt an actual starting voltage of the battery system to a predefined target output voltage of the battery system, the individual battery cells are randomly switched on and off and, therefore, either contribute voltage to the output voltage of the battery system, or not.

In addition, it is known in the prior art to generate a switch-on probability, wherein the battery cells having this switch-on probability are connected to the battery system. If a battery system is designed, for example, for providing a maximum output voltage of 400 volts, wherein all battery cells are interconnected in order to provide the output voltage, and if a target output voltage of 300 volts is required, a switch-on probability of 75% is predefined in order to achieve the predefined target output voltage.

This input voltage is advantageously communicated with the battery cells or corresponding activation circuits of the battery cells via a central communication bus of the battery system. In particular, it is known in this case that each battery cell itself determines a quality factor assigned to the battery cell, which can be dependent, for example, on the battery cell voltage of this battery cell, the battery cell temperature and/or the state of charge (SOC) of the battery cell.

Battery cells are then connected to the battery system with consideration for the quality factor of the battery cell and the predefined switch-on probability. The target output voltage is set on the average in this case. One disadvantage of this method is that the case can occur in which the battery cells are connected in such a way that a great deviation of the actual target voltage from the target output voltage occurs. This would then be corrected by means of the closed-loop control by way of the switch-on probability being suitably adapted. Undesirable outliers of the actual output voltage can occur in this case, however.

Against this background, one problem addressed by the present invention is that of improving the closed-loop control of the output voltage of a battery system. In particular, an improved adaptation of an actual output voltage of a battery system to a target output voltage should be achieved. In this case, strong deviations of the actual output voltage from the target output voltage should be advantageously avoided.

SUMMARY OF THE INVENTION

In order to solve the problem, a method is provided for controlling an output voltage of a battery system comprising a plurality of battery cells which are electrically interconnected in such a way that battery cells of the battery system can each be connected to the battery system and can each be electrically bypassed, wherein, in order to adapt an actual output voltage of the battery system to a target output voltage, at least one switch-on probability is generated and the battery cells having the at least one generated switch-on probability are connected to the battery system, and wherein, in order to adapt the actual output voltage of the battery system to the target output voltage, additionally, at least one switch-off probability is generated and the battery cells having the at least one generated switch-off probability are electrically bypassed. This means that two different probabilities are advantageously transmitted, in the method according to the invention, for connecting battery cells to the battery system and the electrical bypassing of battery cells within the battery system, i.e., quasi for switching battery cells of the battery system on and off. The switch-on probability in this case is the probability that an electrically bypassed battery cell should be connected to the battery system. The switch-off probability, however, is the probability that a battery cell connected to the battery system should be electrically bypassed. One battery cell of the battery system is advantageously always either connected to the battery system or electrically bypassed, wherein the battery cell can switch from one interconnection state into the other interconnection state, i.e., for example, from the "electrically bypassed" interconnection state to the "connected to the battery system", by means of a change in the interconnection, in particular by activating switching elements.

If one battery cell of the battery system is connected to the battery system, this battery cell advantageously contributes voltage to the output voltage of the battery system. Battery cells connected to the battery system are also advantageously recharged during the charging of the battery system.

If one battery cell of the battery system is electrically bypassed, this battery cell advantageously does not contribute voltage to the output voltage of the battery system. Advantageously, electrically bypassed battery cells are also not recharged during the charging of the battery system.

Whether a battery cell of the battery system is connected to the battery system or is electrically bypassed when a switch-on probability or a switch-off probability is transmitted to the battery cells is advantageously decided in dependence on a quality factor assigned to the battery cell, which can depend, in particular, on the state of charge of the battery cell and/or on the battery cell temperature and/or on the battery cell voltage.

Advantageously, the at least one switch-on probability is generated from a switch-on probability function in each case. The at least one switch-off probability is advantageously generated from a switch-off probability function in each case. The switch-on probability function and the switch-off probability function in this case are both advantageously functions which are dependent on the difference of the target output voltage and the actual output voltage of the battery system. This means that the switch-on probability determined via the switch-on probability function, or the switch-off probability determined via the switch-off probability function depends on how greatly the actual output voltage of the battery system deviates from the target output voltage.

According to one embodiment of the invention, the switch-on probability function and/or the switch-off probability function are non-linear functions. According to one preferred embodiment of the invention, the switch-on probability function and the switch-off probability function are linear functions.

In particular, it is provided that the switch-on probability function and the switch-off probability function have mirror symmetry with respect to a symmetry axis which preferably extends through the point at which the target output voltage is equal to the actual output voltage. In particular, it is provided that the switch-on probability function and the switch-off probability function are linear functions in this case.

According to one further advantageous embodiment of the method according to the invention, the at least one switch-on probability is equal to zero when the actual output voltage is greater than the target output voltage and/or the at least one switch-off probability is equal to zero when the actual output voltage is less than the target output voltage. According to this advantageous embodiment, it is therefore provided that, for the case in which the target output voltage is greater than the actual output voltage, only electrically bypassed battery cells may be connected to the battery system, but no connected battery cells may be bypassed. For the case in which the target output voltage is less than the actual output voltage, however, only battery cells connected to the battery system may be electrically bridged.

According to one preferred embodiment of the method according to the invention, in order to adapt an actual output voltage of the battery system to a target output voltage, a switch-on probability and a switch-off probability are generated, wherein the switch-on probability is greater than the switch-off probability when the actual output voltage is less than the target output voltage, and wherein the switch-off probability is greater than the switch-on probability when the actual output voltage is greater than the target output voltage. In this embodiment, it is provided, in particular, that the battery cells are each connected to a battery string via a half-bridge configuration, wherein the battery cell is connected to the battery system or the battery cell is electrically bypassed by activating at least one switching element.

According to one further embodiment of the method according to the invention, it is provided that the connection of the battery cells to the battery system can take place either with positive polarity or with negative polarity for each battery cell, wherein, in order to adapt the actual output voltage to the target output voltage, a positive switch-on probability is generated and the battery cells having the generated positive switch-on probability are connected to the battery system with positive polarity and/or a negative switch-on probability is generated and the battery cells having the generated negative switch-on probability are connected to the battery system with negative polarity and/or a positive switch-off probability is generated and the battery cells having positive polarity and the generated positive switch-off probability are electrically bypassed and/or a negative switch-off probability is generated and the battery cells having negative polarity and the generated negative switch-off probability are electrically bypassed. In particular, it is provided in this case that the battery cells are connected to a battery string of the battery system in a full-bridge configuration.

In this embodiment of the method according to the invention for connecting battery cells to the battery system and for bypassing battery cells of the battery system, different probabilities for switching the battery cells are advantageously transmitted.

The positive switch-on probability in this case is, advantageously, the probability that a bypassed battery cell having positive polarity should be connected to the battery system.

The negative switch-on probability in this case is, advantageously, the probability that a bypassed cell having negative polarity should be connected to the battery system.

The positive switch-off probability in this case is, advantageously, the probability that a battery cell which is connected to the battery system and has positive polarity and should be bypassed.

The negative switch-off probability in this case is, advantageously, the probability that a battery cell which is connected to the battery system and has negative polarity should be bypassed.

In this case, it is provided, in particular, that the switch-on probabilities and the switch-off probabilities are provided with signs. In this case, the positive switch-on probability preferably has a positive sign and the negative switch-on probability has a negative sign. The positive switch-off probability advantageously has a positive sign and the negative switch-off probability has a negative sign.

If the actual output voltage is less than the target output voltage, for example, the probability that a bypassed battery cell is connected to the battery system is high, and the probability that a battery cell connected to the battery system is bypassed is low. The selected functions for generating the particular switch-on and switch-off probabilities are preferably designed so as to be symmetrical, particularly preferably being designed as linear functions.

In order to solve the problem mentioned at the outset, a battery system comprising a plurality of electrically interconnected battery cells, a plurality of activation circuits, and a control unit for the closed-loop control of an output voltage of the battery system provided by the battery cells is also provided, wherein one of the activation circuits is assigned to each of the battery cells and the battery cells can each be connected to the battery system or electrically bypassed by means of the activation circuits, wherein the battery system is advantageously designed for carrying out a method according to the invention.

In particular, it is provided that the battery system is a battery system designed for providing the electrical energy required for operating a hybrid vehicle, a plug-in hybrid vehicle, or an electric vehicle. The battery cells in this case are, advantageously, secondary battery cells, i.e., rechargeable battery cells, preferably lithium ion cells.

In particular, it is provided that the battery system comprises at least one battery string, wherein one battery string includes a plurality of battery cells. Preferably, the battery system comprises multiple battery strings, wherein the battery strings are advantageously electrically connected in parallel.

According to one particularly advantageous embodiment of the battery system according to the invention, the battery system includes at least one battery string, wherein the battery cells are each connected to form a battery string of the battery system in a half-bridge configuration.

According to one further particularly advantageous embodiment of the battery system according to the invention, the battery system includes at least one battery string, wherein the battery cells are connected, in a full-bridge configuration in each case, to a battery string of the battery system. Due to the full-bridge configuration, one battery cell of the battery system is advantageously electrically interconnected in each case in such a way that this battery cell to the battery system can be connected with positive polarity to the battery system, can be connected with negative polarity to the battery system, can be bypassed with positive polarity, and can be bypassed with negative polarity by changing the switch position, wherein the battery cells are advantageously in one of these switching states, except for the switching torque as such.

According to one further particularly advantageous embodiment of the battery system according to the invention, it is provided that the activation circuit assigned to a battery cell includes at least one switching element, at least one driver, at least one microcontroller circuit, and at least one interface. The microcontroller circuit is advantageously designed, in this case, for receiving the at least one switch-on probability and/or the at least one switch-off probability via the at least one interface. Advantageously, the microcontroller circuit is also designed for generating an activation signal on the basis of the at least one switch-on probability and/or the at least one switch-off probability. This activation signal is advantageously transmitted to the at least one driver. The driver is advantageously designed, in this case, for switching the at least one switching element in dependence on the generated activation signal. In particular, it is provided that the switching element is a transistor, preferably a MOSFET (MOSFET: metal oxide semiconductor field-effect transistor). In particular, it is further provided that the battery system includes a bus system, preferably a CAN bus (CAN: Controller Area Network), via which the at least one switch-on probability and/or the at least one switch-off probability is transmitted to the battery cells, preferably being centrally transmitted.

Advantageously, the battery system includes a battery management system. The battery management system preferably includes a control unit in this case. In particular, it is provided that a control unit of the battery management system, preferably the battery control unit (BCU), is designed for generating the at least one switch-on probability and/or the at least one switch-off probability. The actual output voltage and the target output voltage, in particular, are supplied to the control unit in this case. The at least one input probability is advantageously generated from the switch-on probability function and/or the at least one output probability is generated from a switch-off probability function in dependence on the difference of the target output voltage and the actual output voltage in this case. The at least one switch-on probability and the at least one switch-off probability are, advantageously, the manipulated variables of the closed-loop control of the output voltage in this case.

BRIEF DESCRIPTION OF THE DRAWINGS

Further advantageous details, features, and design details of the invention are explained in greater detail in association with the exemplary embodiments represented in the figures. In the drawings.

DETAILED DESCRIPTION

Figure 1:
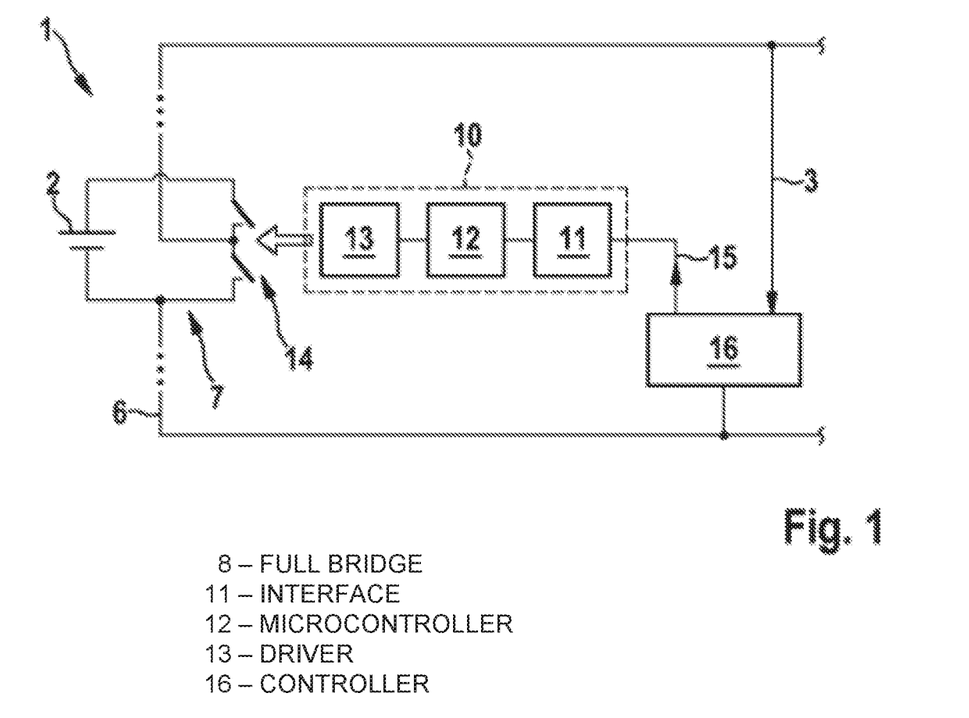
FIG. 1 shows a simplified schematic representation of one exemplary embodiment of a battery system according to the invention.

The battery system 1 represented in FIG. 1 comprises a plurality of electrically interconnected battery cells 2, wherein only one battery cell 2 having an activation circuit 10 assigned to the battery cell 2 is shown, in order to provide a better overview. This arrangement of a battery cell having an activation circuit repeats multiple times in this case, as is symbolically represented by means of the dots in the battery string 6 of the battery system.

In the exemplary embodiment represented in FIG. 1, the battery cells 2 can be connected to the battery system 1 or can be electrically bypassed in a half-bridge configuration 7 via the battery string 6. This depends on the switch position of the switching element 14. The switching element 14 is activated in this case by the activation circuit 10 assigned to the particular battery cell 2. The switching element 14 can be implemented in the form of transistors, in particular, in this case. The activation circuit 10 assigned to a particular battery cell 2 comprises an interface 11, a microcontroller circuit 12, and a driver 13.

The battery system 1 further comprises a control unit 16, wherein the battery control unit of the battery system is advantageously designed as a control unit. The actual output voltage 3 of the battery system 1 is supplied, as an input variable, to the control unit 16 in this case. The control unit 16 in this case is designed for generating a switch-on probability and a switch-off probability as a function of the actual output voltage 3 and the predefined target output voltage. This switch-on probability and switch-off probability are transmitted to the activation circuit 10 via a communication bus 15 of the battery system 1, which is symbolically depicted in FIG. 1 by means of the arrow between the control unit 16 and the interface 11.

The switch-on probability and the switch-off probability are transmitted to the microcontroller circuit 12 via the interface 11. Advantageously, the microcontroller circuit 12 is designed for determining a quality factor assigned to the battery cell 2. Battery cell parameters, in particular, such as the battery cell voltage, the battery cell temperature, and the state of charge of the battery cell, are incorporated into the determination of this quality factor. A good battery cell state results in a high quality factor, and a poor battery cell state results in a low quality factor in this case.

The microcontroller circuit 12 is further designed for determining, on the basis of the received switch-on probability, the received switch-off probability, and the quality factor assigned to the battery cell 2, whether the battery cell 2 should be connected to the battery system 1 or should be electrically bypassed. If the quality factor is high, this favors connecting the battery cell 2 to the battery system 1. If the quality system is low, this favors bypassing the battery cell 2. The microcontroller circuit 12 transmits, to the driver 13, a corresponding switching signal for bypassing the battery cell 2 or for connecting the battery cell 2 to the battery system 1, which driver then switches the switching element 14.

Figure 2:
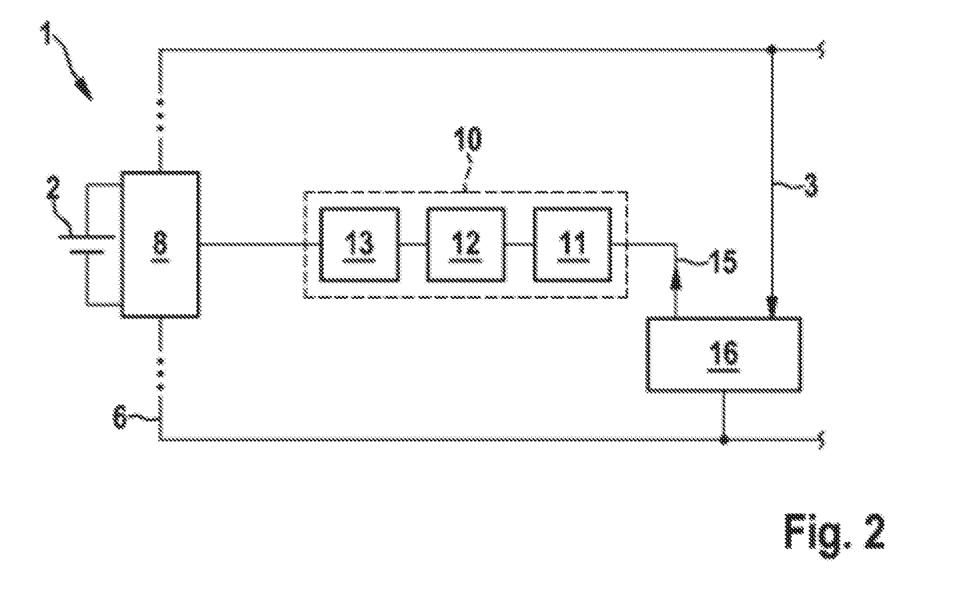
FIG. 2 shows a simplified schematic representation of one further exemplary embodiment of a battery system according to the invention.

FIG. 2 shows an advantageous embodiment of the battery system 1 which is shown in FIG. 1 and is explained in association with FIG. 1. In contrast to the exemplary embodiment represented in FIG. 1, the battery cells 2 of the battery system 1 are connected to the battery string 6 via a full-bridge configuration 8. The full-bridge configuration 8 is schematically represented in FIG. 2. By means of the full-bridge configuration 8, the battery cells 2 can be advantageously connected to the battery system 1 either with negative polarity or with positive polarity. In this case, battery cells having opposite polarity can be advantageously charged by the other battery cells, whereby an autonomous cell balancing can be advantageously carried out. In addition, the battery cells 2 can be bypassed with negative polarity or can be bypassed with positive polarity. The control unit 16 in this case is advantageously designed for generating a positive switch-on probability, a negative switch-on probability, a positive switch-off probability, and a negative switch-off probability.

According to one advantageous, non-illustrated embodiment, it can be provided that a number of battery cells of a battery system is connected in a half-bridge configuration to a battery string of the battery system, and a further number of battery cells of this battery system is connected in a full-bridge configuration to a battery string of this battery system.

FIG. 3 through FIG. 7 show advantageous exemplary embodiments, in simplified x-y coordinate systems, of switch-on probability functions and switch-off probability functions, from which switch-on probabilities and switch-off probabilities can be generated within the scope of carrying out a method according to the invention. In this case, the switch-on probability functions and switch-off probability functions are functions of ΔU, wherein ΔU is the difference of the target output voltage and the actual output voltage of a battery system. This means that assigned to each value ΔU is a specific switch-on probability $P_{IN}$ and a specific switch-off probability $P_{OUT}$.

The switch-on probabilities $P_{IN}$ and the switch-off probabilities $P_{OUT}$ are plotted on the y-axis, and the values for ΔU are plotted on the x-axis. In this case, it is provided, in particular, that values for ΔU left of the y-axis are negative, i.e., the actual output voltage left of the y-axis is greater than the target output voltage.

Figure 3:
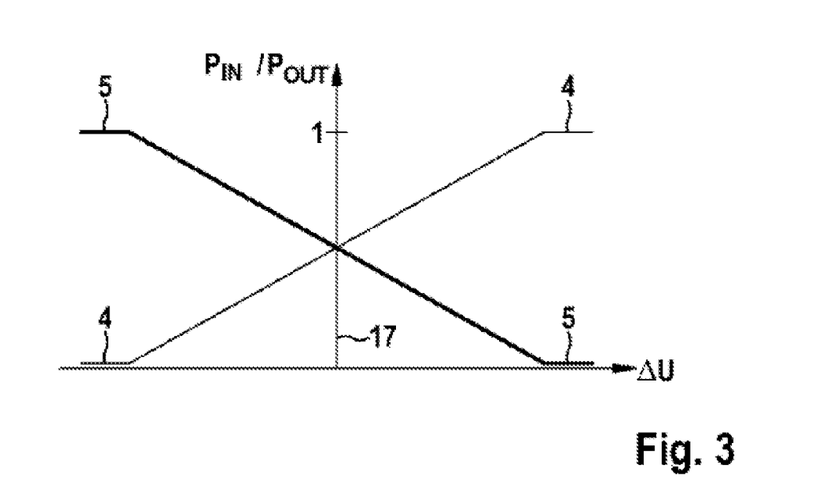
FIG. 3 shows a schematic representation of one exemplary embodiment of a switch-on probability function for generating a switch-on probability, and a switch-off probability function for generating a switch-off probability for a method according to the invention.

FIG. 3 shows one advantageous exemplary embodiment of a switch-on probability function 4 and a switch-off probability function 5, from which a switch-on probability and a switch-off probability, respectively, are generated. In this case, the switch-on probability function 4 and the switch-off probability function 5 are functions of ΔU, wherein ΔU is the difference of the target output voltage and the actual output voltage of a battery system.

In the exemplary embodiment represented in FIG. 3, the switch-on probability function 4 and the switch-off probability function 5 are symmetrical with respect to the symmetry axis 17 which is formed by the y-axis and which passes through the point at which the target output voltage is equal to the actual output voltage. In particular, it is provided that the switch-on probability and the switch-off probability can each assume a value between "0" and "1".

As is apparent from FIG. 3, the switch-on probability function and the switch-off probability function are linear functions in the exemplary embodiment. If the actual output voltage is less than the target output voltage, i.e., ΔU is positive, the switch-on probability $P_{IN}$ is high and the switch-off probability $P_{OUT}$ is low. However, if the actual output voltage is greater than the target output voltage, i.e., ΔU is negative, the switch-on probability $P_{IN}$ is less than the switch-off probability $P_{OUT}$.

Figure 4:
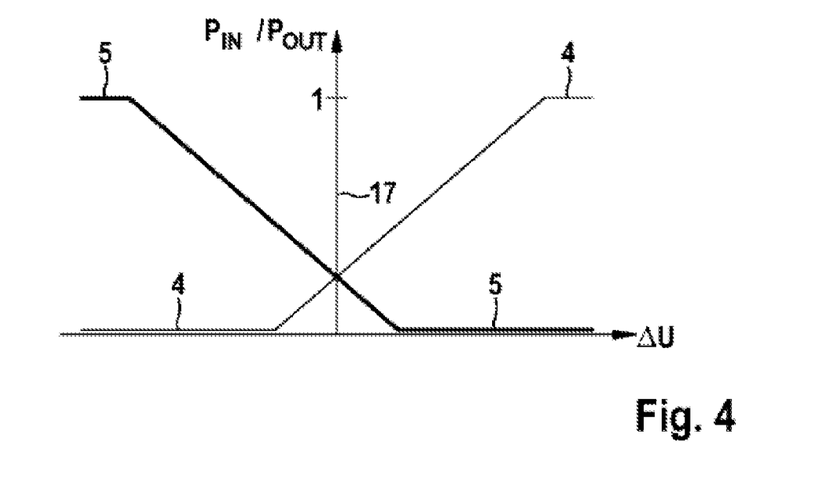
FIG. 4 shows a schematic representation of one further exemplary embodiment of a switch-on probability function for generating a switch-on probability, and a switch-off probability function for generating a switch-off probability for a method according to the invention.

FIG. 4 shows one further advantageous exemplary embodiment of a switch-on probability function 4 and a switch-off probability function 5, which is not designed so as to have mirror symmetry with respect to the axis 17.

Figure 5:
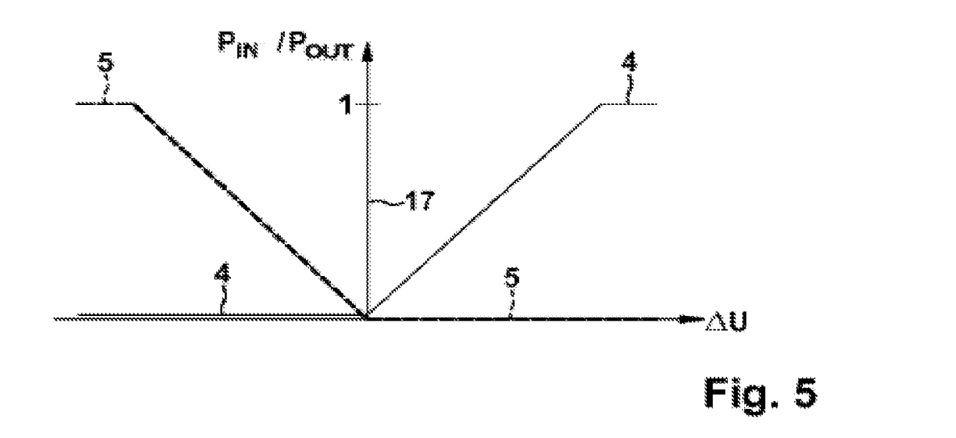
FIG. 5 shows a schematic representation of one further exemplary embodiment of a switch-on probability function for generating a switch-on probability, and a switch-off probability function for generating a switch-off probability for a method according to the invention.

FIG. 5 shows one further advantageous exemplary embodiment of a switch-on probability function 4 and a switch-off probability function 5, wherein it is provided that the switch-on probability $P_{IN}$ is equal to zero when the actual output voltage is greater than the target output voltage. In addition, it is provided that the output probability $P_{OUT}$ is equal to zero when the actual output voltage is less than the target output voltage.

Figure 6:
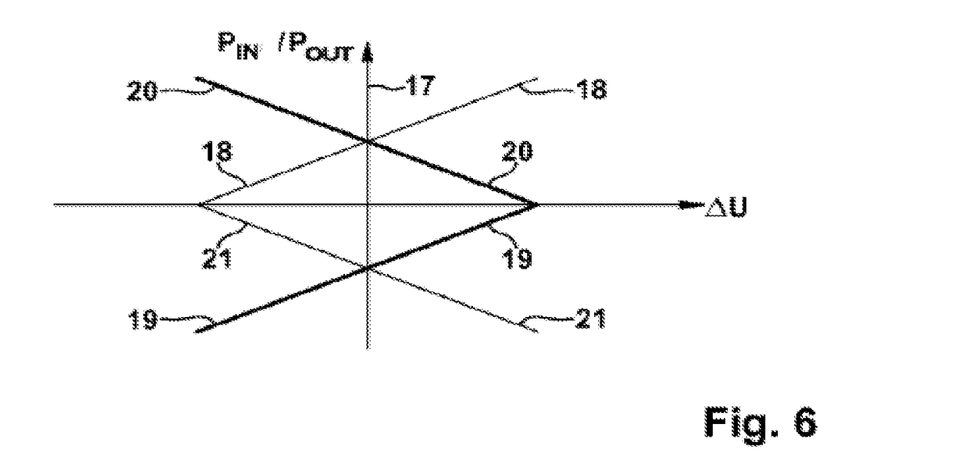
FIG. 6 shows a simplified representation of one exemplary embodiment of a positive switch-on probability function, a negative switch-on probability function, a positive switch-off probability function, and a negative switch-off probability function for generating corresponding switch-on probabilities and switch-off probabilities for a method according to the invention.
Figure 7:
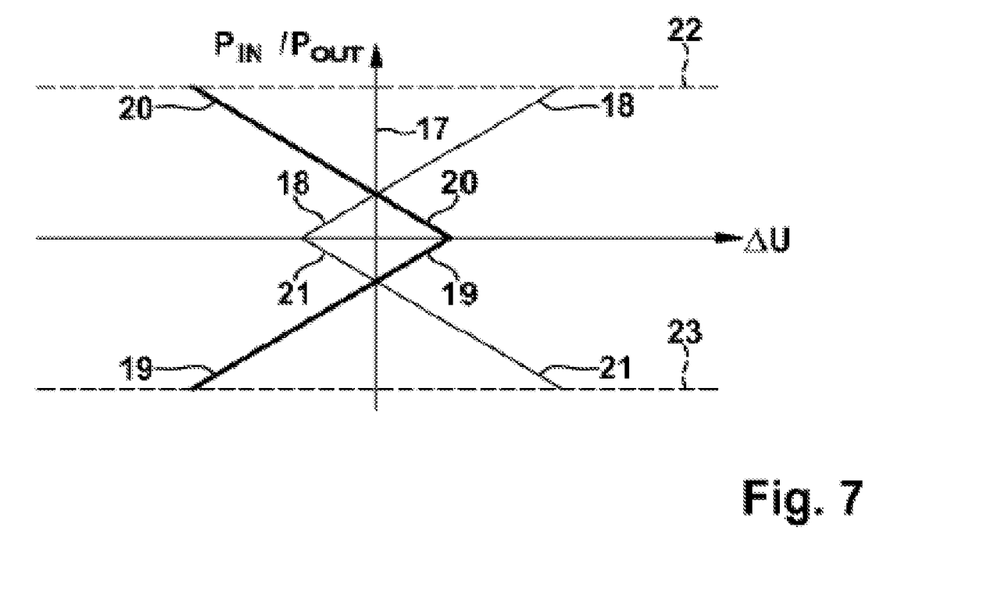
FIG. 7 shows a simplified representation of one further exemplary embodiment of a positive switch-on probability function, a negative switch-on probability function, a positive switch-off probability function, and a negative switch-off probability function for generating corresponding switch-on probabilities and switch-off probabilities for a method according to the invention.

FIG. 6 and FIG. 7 show advantageous embodiments of positive switch-on probability functions 18, negative switch-on probability functions 19, positive switch-off probability functions 20, and negative switch-off probability functions 21, which can be utilized for generating a positive switch-on probability $P_{IN}$, a negative switch-on probability $P_{IN}$, a positive switch-off probability $P_{OUT}$ and a negative switch-off probability $P_{OUT}$, in particular in a battery system, in which battery cells are interconnected in a full-bridge configuration, as is explained in association with FIG. 2, in particular. In this case, it is provided, in particular, that the negative switch-on probability function yields a switch-on probability $P_{IN}$ having a negative sign, and the negative switch-off probability function yields a switch-off probability $P_{OUT}$ having a negative sign.

In the exemplary embodiment represented in FIG. 7, the switch-on probabilities $P_{IN}$ and the switch-off probabilities $P_{OUT}$, starting at a certain value for ΔU, are limited to a maximum value 22 and a minimum value 23.

The exemplary embodiments which were represented in the figures and which were explained in association therewith are intended for explaining the invention and are not limiting therefor.

The invention claimed is:

1. A method for controlling an output voltage of a battery system (1) comprising a plurality of battery cells (2) which are electrically interconnected in such a way that battery cells (2) of the battery system (1) can each be connected to the battery system (1) and can each be electrically bypassed, wherein, in order to adapt an actual output voltage (3) of the battery system (1) to a target output voltage, at least one switch-on probability is generated and the battery cells (1) having the at least one generated switch-on probability are connected to the battery system (1), characterized in that, in order to adapt the actual output voltage (3) of the battery system (1) to the target output voltage, additionally, at least one switch-off probability is generated and the battery cells (1) having the at least one generated switch-off probability are electrically bypassed; wherein the switch-on probability is greater than the switch-off probability when the actual output voltage is less than the target output voltage, and wherein the switch-off probability is greater than the switch-on probability when the actual output voltage is greater than the target output voltage, wherein the connection of the battery cells (2) to the battery system (1) takes place either with positive polarity or with negative polarity for each battery cell (2), wherein, in order to adapt the actual output voltage (3) to the target output voltage, a positive switch-on probability is generated and the battery cells (2) having the generated positive switch-on probability are connected to the battery system (1) with positive polarity and/or a negative switch-on probability is generated and the battery cells (2) having the generated negative switch-on probability are connected to the battery system (1) with negative polarity and/or a positive switch-off probability is generated and the battery cells (2) having positive polarity and the generated positive switch-off probability are electrically bypassed and/or a negative switch-off probability is generated and the battery cells (2) having negative polarity and the generated negative switch-off probability are electrically bypassed.

2. The method as claimed in claim 1, characterized in that the at least one switch-on probability is generated from a switch-on probability function (4) in each case and/or the at least one switch-off probability is generated from a switch-off probability function (5) in each case, wherein the switch-on probability function (4) and the switch-off probability function (5) are both functions which are dependent on the difference of the target output voltage and the actual output voltage.

3. The method as claimed in claim 2, characterized in that the switch-on probability function (4) and the switch-off probability function (5) have mirror symmetry with respect to a symmetry axis (17) which extends through the point at which the target output voltage is equal to the actual output voltage.

4. The method as claimed in claim 1, characterized in that the at least one switch-on probability is equal to zero when the actual output voltage (3) is greater than the target output voltage and/or the at least one switch-off probability is equal to zero when the actual output voltage (3) is less than the target output voltage.

5. A battery system (1) comprising a plurality of electrically interconnected battery cells (2), a plurality of activation circuits (10), and a control unit for closed-loop control of an output voltage of the battery system (1) provided by the battery cells (2), wherein one of the activation circuits (10) is assigned to each of the battery cells (2) and the battery cells (2) are connected to the battery system (1) or electrically bypassed by the activation circuits (10), characterized in that the battery system (1) is configured to carry out the method as claimed in claim 1.

6. The battery system (1) as claimed in claim 5, characterized in that the battery system comprises at least one battery string (6), wherein the battery cells (2) are connected, in a half-bridge configuration (7) in each case, to a battery string (6) of the battery system (1).

7. The battery system (1) as claimed in claim 5, characterized in that the battery system comprises at least one battery string (6), wherein the battery cells (2) are connected, in a full-bridge configuration (8) in each case, to a battery string (6) of the battery system (1).

8. The battery system (1) as claimed in claim 5, characterized in that the activation circuits (10) each comprise at least one switching element (14), at least one driver (13), at least one microcontroller circuit (12), and at least one interface (11), wherein the microcontroller circuit (12) is configured to receive, via the at least one interface (11), the at least one switch-on probability and/or the at least one switch-off probability and, based thereon, to generate an activation signal, and wherein the driver (13) is configured to switch the at least one switching element (14) based on the generated activation signal.

* * * * *